United States Patent

[11] 3,633,103

[72] Inventor Mineo Sugiyama
Tokyo, Japan
[21] Appl. No. 57,186
[22] Filed July 22, 1970
[45] Patented Jan. 4, 1972
[73] Assignee Nippon Electric Co., Ltd.
Tokyo, Japan
[32] Priority July 25, 1969
[33] Japan
[31] 44/59155

[54] MICROWAVE RELAY EQUIPMENT
3 Claims, 3 Drawing Figs.

[52] U.S. Cl. .......... 325/11, 325/10
[51] Int. Cl. .......... H04b 3/36
[50] Field of Search .......... 325/9, 10, 11

[56] References Cited

UNITED STATES PATENTS 3,310,740 3/1967 Leysieffer .......... 325/2

FOREIGN PATENTS 1,113,720 9/1961 Germany .......... 325/11
625,358 6/1949 Great Britain .......... 325/11

*Primary Examiner*—Robert L. Richardson
*Attorney*—Sandoe, Hopgood & Calimafde

ABSTRACT: A microwave repeated in which only a single diplexing filter is employed and in which no dummy load element is required. The input terminal is connected directly to one port of a four-port directional coupler and a second port of the coupler is coupled directly to a receiving frequency converter.

*INVENTOR*
Mineo Sugiyama
*by*
Sandoe, Hopgood & Calimafde
ATTORNEYS

MICROWAVE RELAY EQUIPMENT

This invention relates generally to microwave relay equipment and, more particularly, to microwave relay equipment of the kind incorporating a four-port directional coupler.

As is known, conventional relay equipment used in a microwave carrier transmission system may be classified into three categories: direct repeater system, heterodyne repeater system, and detection repeater system. No further discussion will be made herein of the direct repeater system, since the present invention is concerned only with the latter two systems.

In a heterodyne repeater system, the frequency of a received carrier wave is converted into a signal lying in an intermediate-frequency band. The frequency converted signal in the intermediate-frequency band is then amplified, and the amplified intermediate-frequency signal is reconverted into a transmitting signal by a transmitting frequency converted for transmission to a subsequent repeater or to a receiver.

In a detection repeater system, the intermediate-frequency signal is demodulated by a demodulator, and the demodulated sign is then caused to modulate an intermediate frequency signal, which is in turn caused to modulate the transmission carrier wave.

In any of these systems, the repeater requires the use of two local oscillators, namely a receiving and a transmitting local oscillator. It has been the general practice, however, to employ a signal local oscillator common to the receiving side and the transmitting side, and to feed a portion of the signal generated by the local oscillator as the transmitting local oscillator to the receiving side.

These conventional repeaters employ two diplexing filters to feed the oscillated signal to frequency converters at the receiving and transmitting sides. In addition, the known repeaters require the use of a dummy load. The need for the second diplexing filter and the dummy load increases the cost and complexity of the conventional repeater.

It is, therefore, an object of this invention to provide a simplified microwave repeater or relay equipment in which only one diplexing filter is utilized and the dummy load is dispensed with.

It is a further object of the invention to provide a carrier repeater of reduced size and cost as compared to the presently known types of repeaters.

It is another object of the present invention to provide a carrier repeater that is particularly well suited in applications requiring a plurality of such repeaters, such as a carrier transmission system, wherein the overall size and installation costs can be appreciably reduced.

Figure 1:
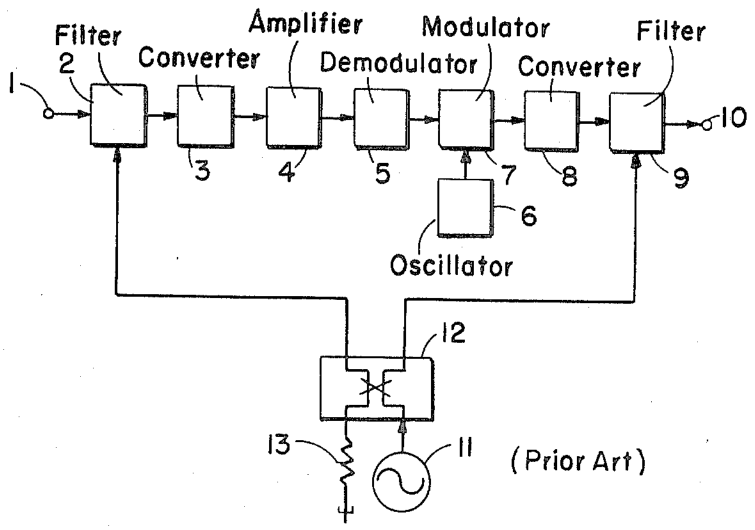
Figure 2:
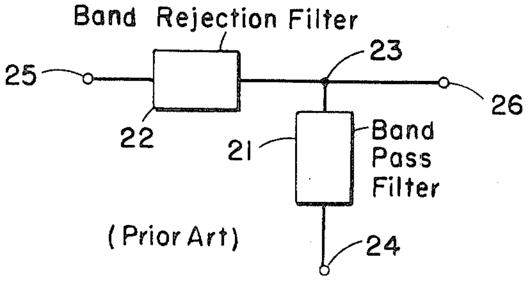
Figure 3:
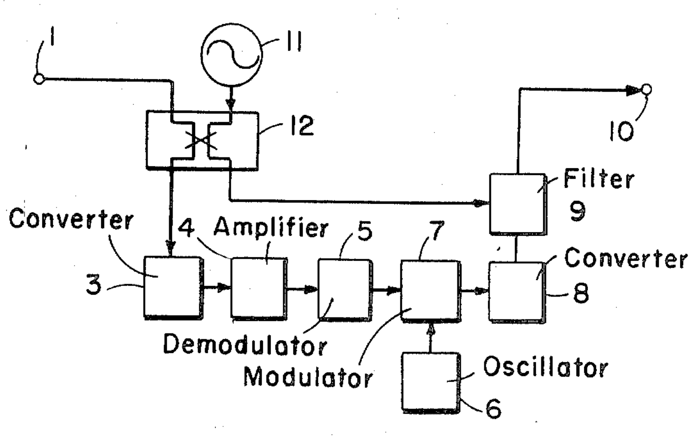

To the accomplishment of the above and to such further objects as may hereinafter appear, the present invention relates to a microwave relay equipment substantially as defined in the appended claims and as described in the following specification taken together with the accompanying drawings in which:

FIG. 1 is a block diagram of a conventional repeater;

FIG. 2 schematically shows a simplified diplexing filter which may be employed in the repeater of FIG. 1; and FIG. 3 is a block diagram of an embodiment of this invention.

The prior art detection repeater shown in FIG. 1 consists of a receiving input end 1, and a first diplexing filter circuit 2 coupled to end 1 for combining the reception signal power and the local oscillator power. A receiving frequency converter 3 is coupled to the output of circuit 2 and an intermediate-frequency amplifier 4 is coupled to the output of converter 3. A demodulator 5 is coupled to the output of amplifier 4. A transmitting intermediate-frequency oscillator 6 applies an intermediate-frequency signal to a modulator 7 coupled to the output of demodulator 5 for modulating the output of the transmitting IF oscillator 6 with the output of the demodulator 5. A transmitting frequency converter 8 is coupled to the output of modulator 7 and another diplexing filter circuit 9 is coupled to the output of converter 8 for feeding the output of the transmitting local oscillator to the transmitting frequency converter 8. The output of filter circuit 9 is coupled to a transmitting output end 10. A transmitting local oscillator 11 is coupled to one port of a four-port directional coupler 12, and a nonreflecting termination or dummy load 13 is coupled to another port of coupler 12. The other ports of coupler 12 are respectively coupled to the inputs of the two diplexing filter circuits 2 and 9.

As is evident from the illustration of FIG. 1, the supply of energy generated by the local oscillator 11 to both diplexing filter circuits 2 and 9 is accomplished by applying the output of the local oscillator 11 to the lower port of the four-port directional coupler, thereby applying the local oscillator output to the receiving diplexing filter circuit 2, while at the same time, applying the local oscillator output to the transmitting diplexing filter circuit 9.

FIG. 2 illustrates in schematic block form an example of a diplexing filter circuit for use as filter circuit 2 or 9 of the prior art embodiment of FIG. 1. Power from local oscillator 11 is applied to terminal 24. A band-pass filter 21 coupled to terminal 24 is designed to pass the frequency of the local oscillator. A band-rejection filter 22 designed to reject the frequency of the local oscillator is coupled to filter 21 at a T-junction 23. The local oscillator output applied to terminal 24 is branched out into two equal portions at the T-junction 23, one portion reaching terminal 26 and the other portion being reflected in the band-rejection filter 22.

Provided that the distance between the equivalent short-circuiting plane in the bnad-rejection filter 22 and the junction 23 is equal to an integral multiple of one-half wavelength of the oscillation frequency of the local oscillator, the output signal from the band-pass filter 21 and the reflected signal from band-rejection filter 22 become in phase at T-junction 23, whereby energy applied to terminal 24 can be transmitted, in its entirety, to terminal 26.

As is evident from this illustration, the receiving and frequency conversion sections 1, 2, and 3 of the repeater shown in FIG. 1 display its function by applying a receiving signal to terminal 25, applying the local oscillator energy to terminal 24, and connecting a receiving frequency converter to terminal 26. In a similar manner, the transmitting and frequency conversion sections 8, 9 and 10 of the repeater shown in FIG. 1 for deriving the transmitting output from terminal 25 is realized by connecting a transmitting frequency converter to terminal 26 of the same circuit.

Such a method of installing two similar diplexing filter circuits, one on the receiving and the other on the transmitting side of the repeater, has been the generally accepted practice in designing repeaters for either the heterodyne repeater or the detection repeater system.

The present invention provides a carrier repeater of either the detection repeater or the heterodyne repeater system featured by circuit simplicity, in which one of the two diplexing filter circuits used in the conventional design, that is, the receiving diplexing filter circuit, as well as the nonreflecting termination are dispensed with.

The invention may be best understood from a consideration of the following detailed description taken in connection with FIG. 3 which illustrates by a block diagram a repeater of the detection repeater system according to a preferred embodiment of the invention.

Referring to FIG. 3, in which elements corresponding to those in the embodiment of FIG. 1 are identified by corresponding reference numerals, there is shown a repeater consisting of a receiving input end 1 and a receiving frequency converter 3. An intermediate-frequency amplifier 4 is coupled to the output of converter 3 and a demodulator 5 is coupled to the output of amplifier 4. A transmitting intermediate-frequency oscillator 6 feeds an intermediate-frequency signal to a modulator 7 coupled to the output of demodulator 5 for modulating the output of the oscillator 6 with the output of the demodulator 5. A transmitting frequency converter 8 is coupled to the output of modulator 7, and a transmitting diplexing filter circuit 9 is coupled to converter 8 for feeding power derived from a transmitting local oscillator 11 to transmitting frequency converter 8, and a transmitting output end 10 is coupled to diplexer circuit 9. A four-port directional coupler 12 has ports respectively coupled to input end 1, converter 3, diplexer filter circuit 9, and local oscillator 11.

A comparison of the repeater structure of the present invention as shown in FIG. 3 with the prior art repeater of FIG. 1 readily reveals that the outstanding feature of this invention resides in the dispensing of the receiving diplexing filter circuit shown at 2 in FIG. 1 and the nonreflecting termination shown at 13 in FIG. 1.

Since the output of local oscillator 11 is applied to the upper right port of the four-port directional coupler 12 in the repeater of FIG. 3, that portion of energy generated by local oscillator 11 is fed to transmitting diplexing filter circuit 9, while a minor portion of the energy is fed to receiving frequency converter 3. In the repeater of FIG. 3, the apprehension that a portion of the energy generated by local oscillator 11 may be coupled to receiving input end 1 is substantially eliminated because of the "directivity" of directional coupler 12.

In addition, in the repeater of FIG. 3, the amount of energy from the local oscillator required for the receiving frequency converter may be smaller than that required for the transmitting frequency converter, with the result that the "-coupling" may be designed sufficiently small. Therefore, the transmission loss in the four-port directional coupler for the receiving signal in the repeater of FIG. 3 can be made extremely small.

From the foregoing description, it will be evident that whereas conventional carrier repeaters require two diplexing filter circuits and a dummy load, the repeater of the present invention has succeeded in the elimination of one of the two diplexing filter circuits and the dummy load.

Therefore, carrier repeaters according to this invention hold a great deal of practical utility and merit for use in carrier transmission systems in which large quantities of such repeaters are employed, in that the overall size can be made smaller, the manufacturing cost reduced, and eventually the installation cost of carrier transmission systems can be considerably economized.

While a description has been made above in connection with the carrier repeater of the detection repeater system as a specific embodiment of this invention, it will be obvious to one skilled in the art that this invention is equally applicable to a carrier repeater of the heterodyne repeater system with but a minor modification in the circuit of FIG. 3.

Thus while only a single embodiment of the present invention has been herein specifically described it will be apparent that modifications may be therein without departing from the spirit and the scope of the invention.

I claim:

1. A microwave relay equipment comprising input means for receiving an incoming microwave signal, a four-port directional coupler having first, second third and fourth ports, with said first port coupled to said input means, means for providing a local oscillation signal coupled to said third port, a frequency converter coupled to said fourth port for receiving a portion of said local oscillation signal together with said incoming microwave signal and for down-converting the frequency of said incoming microwave signal, means coupled to said frequency converter for up-converting the frequency of the output of said frequency converter, diplexing filter means coupled to said second port and said up-converting mans for feeding said local oscillation to said up-converting means, and output means coupled to said diplexing filter means for deriving the up-converted output through said diplexing filter means.

2. The microwave relay equipment of claim 1, further comprising amplifier means operatively interposed between said frequency converter and said frequency up-converting means.

3. The microwave relay equipment of claim 2, further comprising demodulating means coupled to the output of said amplifier means, modulating means coupled to the output of said demodulating means and having an output coupled to the input of said frequency up-converting means, and means for providing a second local oscillation signal to said modulating means.

* * * * *